United States Patent Office 2,996,497
Patented Aug. 15, 1961

2,996,497
NITROGEN-CONTAINING ESTERS OF CELLULOSE
George P. Touey and John R. Caldwell, Kingsport, Tenn., assignors to Eastman Kodak Company, Rochester, N.Y., a corporation of New Jersey
No Drawing. Filed Oct. 29, 1958, Ser. No. 770,286
7 Claims. (Cl. 260—213)

This invention relates to the preparation of nitrogen-containing esters of cellulose by reacting upon cellulose with a monoamide of a dicarboxylic acid in the presence of an impelling anhydride and an acid catalyst.

There have been disclosures of cellulose esters containing nitrogen adapted for use for certain special purposes. For instance, many cellulose esters containing nitrogen exhibit affinity for dyes not exhibited by the conventional fatty acid esters of cellulose. Also, the incorporation of nitrogen-containing groups in some cellulose esters provides internal plasticization of the cellulose ester, making possible reduction of the amount of plasticizer which is employed therewith in the preparation of products.

One object of our invention is to provide nitrogen-containing esters of cellulose. Another object of our invention is to provide esters of cellulose in which the nitrogen is present in the form of amide groups. A further object of our invention is to provide a method for introducing amide groups into cellulose derivatives. A still further object of our invention is to provide cellulose derivatives useful for the manufacture of fibers, films and molded products. Other objects of our invention will appear herein.

In its broadest aspects, our invention involves reacting upon cellulose with an esterification bath comprising a monoamide of a dicarboxylic acid whose carboxyl groups are connected by a chain of 2–3 carbon atoms, an impelling anhydride and an acid catalyst. Our invention includes the use of either substituted amides or unsubstituted amides. As a result, numerous types of esters differing substantially in properties can be obtained. For instance, certain esters prepared in accordance with our invention are valuable for the production of fibers having improved dye affinity. Other esters in accordance with our invention are useful for preparing molded products because of internal plasticization characteristics found therein.

The monoamides which are useful in accordance with our invention are derived from dicarboxylic acids having a chain of 2–3 carbon atoms connecting the carboxyl groups. Suitable acids include succinic, glutaric, o-phthalic, cyclohexane-1,2-dicarboxylic, cyclohexane-1,3-dicarboxylic, and norcamphane-2,3-dicarboxylic. The amide groups may contain one or two substituents as shown by the general formula:

$$-N\begin{matrix}R'\\R\end{matrix}$$

in which R is hydrogen, alkyl containing 1 to 8 carbon atoms, or cycloalkyl and R' is hydrogen, alkyl containing 1 to 8 carbon atoms, cycloalkyl or aryl. The R and R' may be combined to form a cyclic structure of the piperidine, morpholine or pyrrolidine type. The monoamides which are useful in accordance with our invention are prepared by heating dicarboxylic acid anhydrides with an equivalent amount of ammonia, primary amine, or secondary amine. Some monoamides useful in carrying out our invention are:

| | M.P.,° C. |
|---|---|
| N,N-dimethyl succinamic acid | 87 |
| N-isobutyl succinamic acid | 91 |
| N,N-diisobutyl phthalamic acid | 115 |
| N,N-diisobutyl succinamic acid | 62 |
| γ-Oxo-4-morpholine butyric acid | 77 |

N,N-diethyl glutaramic acid
N-phenyl glutaramic acid
N-cyclohexyl glutaramic acid The nitrogen-containing cellulose esters in accordance with our invention are prepared by reacting upon cellulose with a mixture of the dicarboxylic acid monoamide and an impelling anhydride, particularly acetic anhydride, using an acid catalyst. Catalysts which have been found to be useful in this connection are sulfuric acid, perchloric acid and sulfoacetic acid. The reacting materials may, if desired, be diluted with an inert diluent such as dioxane, toluene, methylene chloride or the like.

In preparing products in accordance with our invention the dicarboxylic acid monoamides have been found to react with the cellulose substantially quantitatively even though acetic anhydride is employed as the impelling anhydride therein. After the monoamide acid groups have all been used in esterifying the cellulose, the hydroxyls of the cellulose which are as yet unesterified are then reacted upon with the acetic anhydride to impart fatty acid radicals thereto. In the process of making esters in accordance with our invention the amount of dicarboxylic acid monoamide, therefore, is directly related to the amount of dicarboxylic acid monoamide introduced into the reaction mass. It has been noted that in general the dye affinity and moisture absorption of the product obtained increases with the increase of nitrogen content in the product obtained. For instance, one amide group can, if desired, be introduced per glucose unit.

The following examples illustrate our invention.

*Example 1*

One hundred parts of cotton linters were soaked in water and dewatered with 1,4-dioxane. The linters wet with 600 parts of dioxane were mixed with a composition comprising 30 parts of N,N-dimethyl succinamic acid, 5 parts of sulfuric acid and 100 parts of acetic anhydride for one hour at 70° C. 300 parts of acetic anhydride were then added and the mass was subjected to mixing at 70° F. for 2¾ hours, the linters having dissolved.

The product thus prepared contained 1.43% nitrogen and 40.5% acyl (calculated as acetyl); thus was substantially completely esterified. The sulfuric acid catalyst therein was neutralized with magnesium acetate. The mass was precipitated by pouring into rapidly agitating water and the product obtained was washed with water. There was obtained a product containing both acetyl groups and dimethyl succinamic acid groups. The resulting fibers exhibited much greater affinity for dyes than fibers of the same type prepared from cellulose triacetate.

*Example 2*

One hundred parts of acetylation grade wood pulp were soaked in water, dewatered with 1,4-dioxide and then were mixed with 48 parts of N-isobutyl succinamic acid, 100 parts of acetic anhydride and 5 parts of sulfuric acid at 70° C. for one hour. 300 parts of acetic anhydride

was added and the mass was mixed at 70° C. until the cellulose dissolved (3 hours). The sulfuric acid catalyst employed was neutralized with magnesium acetate. The mass was poured into water and the precipitate obtained was washed with water. The product was completely esterified, 92–97% of the isobutyl succinamic acid used in the reaction having combined with the cellulose. Analysis indicated the product had a nitrogen content of 2.5% and an acyl content of 40.3% (calculated ac acetyl). The ester was soluble in acetone and in cellulose triacetate solvents. Fibers were prepared from this material and were found to be easily dyed with acid wool dyes such as Brilliant Milling Blue B and Ahcoquinone Cyanthrol BGAH.

*Example 3*

One hundred parts of cotton linters were soaked in water, and were then dewatered with acetic acid. The acetic acid was then replaced with toluene. The resulting linters containing 600 parts of toluene were mixed with 52.5 parts of γ-oxo-4-morpholidine butyric acid, 100 parts of acetic anhydride and 7 parts of sulfoacetic acid and the mixing was maintained for 1 hour at 70° C. 300 parts of acetic anhydride were added and the mass was mixed at 70° C. for 4 hours. The mass was washed with methanol and then with water. The dried sample analyzed 1.82% nitrogen and 35.1% acyl (calculated as acetyl). This indicated the product was completely esterified and that 90–95% of the γ-oxo-4-morpholidine butyric acid used in the reaction combined with the cellulose.

We claim:

1. A method of preparing a nitrogen-containing ester of cellulose which comprises reacting cellulose with a monoamide of a dicarboxylic acid, the carboxyls of which were joined by a chain of 2–3 carbon atoms, the amide portion of which has the general formula

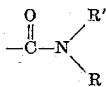

in which R is selected from the group consisting of hydrogen, alkyl of 1–8 carbon atoms, cycloalkyl and part of a cyclic structure and R' is selected from the group consisting of hydrogen, alkyl of 1–8 carbon atoms, cycloalkyl, aryl and the remainder of the said cyclic structure, the combination of R and R' when forming the cyclic structure being selected from the group consisting of piperidine, morpholine and pyrrolidine, while in contact with acetic anhydride and an acid catalyst.

2. A method of preparing a nitrogen-containing ester of cellulose which comprises reacting cellulose with a monoamide of succinic acid, the amide group of which has the general formula:

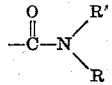

in which R is selected from the group consisting of hydrogen, alkyl of 1–8 carbon atoms, cycloalkyl and part of a cyclic structure and R' is selected from the group consisting of hydrogen, alkyl of 1–8 carbon atoms, cycloalkyl, aryl and the remainder of the said cyclic structure, the combination of R and R' when forming the cyclic structure being selected from the group consisting of piperidine, morpholine and pyrrolidine, while in contact with acetic anhydride and an acid catalyst.

3. A method of preparing a nitrogen-containing ester of cellulose which comprises reacting cellulose with a monoamide of o-phthalic acid, the amide group of which has the general formula:

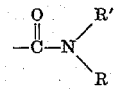

in which R is selected from the group consisting of hydrogen, alkyl of 1–8 carbon atoms, cycloalkyl and part of a cyclic structure and R' is selected from the group consisting of hydrogen, alkyl of 1–8 carbon atoms, cycloalkyl, aryl and the remainder of the said cyclic structure, the combination of R and R' when forming the cyclic structure being selected from the group consisting of piperidine, morpholine and pyrrolidine, while in contact with acetic anhydride and an acid catalyst.

4. An ester of cellulose containing acetyl groups and acyl groups having the structure:

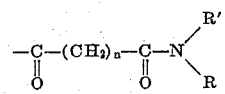

in which $n$ is 2–3, R is selected from the group consisting of hydrogen, alkyl of 1–8 carbon atoms, cycloalkyl and part of a cyclic structure and R' is selected from the group consisting of hydrogen, alkyl of 1–8 carbon atoms, cycloalkyl, aryl and the remainder of the said cyclic structure, the combination of R and R' when forming the cyclic structure being selected from the group consisting of piperidine, morpholine and pyrrolidine, while in contact with acetic anhydride and an acid catalyst.

5. Cellulose acetate N,N dimethyl succinamate.
6. Cellulose acetate N-isobutyl succinamate.
7. Cellulose acetate γ-oxo-4-morpholinebutyrate.

References Cited in the file of this patent

UNITED STATES PATENTS

| | | |
|---|---|---|
| 1,861,200 | Webber et al. | May 31, 1932 |
| 2,093,462 | Malm et al. | Sept. 21, 1937 |
| 2,461,152 | Gardner | Feb. 8, 1949 |